United States Patent
Robinson

[15] 3,654,020
[45] Apr. 4, 1972

[54] PROCESS FOR THE PREPARATION OF TISSUE-FIBER LAMINATES

[72] Inventor: James E. Robinson, Neenah, Wis.
[73] Assignee: Kimberly-Clark Corporation, Neenah, Wis.
[22] Filed: Mar. 30, 1970
[21] Appl. No.: 23,889

[52] U.S. Cl..............................156/291, 156/277, 156/295, 156/324
[51] Int. Cl.............................................................B32b 7/14
[58] Field of Search..........................156/277, 291, 295, 324

[56] References Cited

UNITED STATES PATENTS

| | | |
|---|---|---|
| 2,902,395 | 9/1959 | Hirschy et al.................156/291 X |
| 3,138,514 | 6/1964 | Florio..............................156/291 X |
| 3,327,808 | 6/1967 | Sokolowski....................156/290 X |

*Primary Examiner*—Carl D. Quarforth
*Assistant Examiner*—E. A. Miller
*Attorney*—Wolfe, Hubbard, Leydig, Voit & Osann, Ltd.

[57] ABSTRACT

Tissue-fiber laminates are prepared by substantially completely embedding a nonwoven fibrous web in a patterned layer of a plastisol adhesive partially embedded in the tissue web. Embedment of the fibrous web is accomplished while the adhesive is in a fluid state.

6 Claims, 4 Drawing Figures

Patented April 4, 1972

3,654,020

INVENTOR.
JAMES E. ROBINSON,
BY Wolfe, Hubbard, Leydig, Voit & Osann
ATTORNEYS.

PROCESS FOR THE PREPARATION OF TISSUE-FIBER LAMINATES

DESCRIPTION OF THE INVENTION

This invention relates to tissue-fiber laminates and their method of manufacture.

Sokolowski (U.S. Pat. No. 3,327,708 issued July 27, 1967) discloses a process for manufacture of a tissue-fiber laminate in which an open pattern of adhesive is printed on the surface of a tissue web, and a drafted web of synthetic fibers is laid on the surface of the adhesive and bonded to the tissue web. The fibers are bonded and held in alignment on the surface of the tissue web by partial embedment in the pattern of adhesive. This process is intended for making nonwoven end use products, and, in order to provide a product with a smooth body-contacting fiber surface, it was regarded as important to maintain the surface of the fiber layer substantially free from exposed adhesive due to penetration through the fiber layer. The fibers, therefore, were pressed into the surface of the adhesive to secure embedment without causing penetration of the adhesive through the fiber layer to the surface thereof.

Cross-laid products using several tissue-fiber laminates of the Sokolowski type are disclosed in U.S. Pat. No. 3,484,330. In the cross-laid product, the tissue layers are exposed on both outer surfaces and the fiber layers are in face to face contact on the inside of the two ply assembly. Additional products prepared from tissue-fiber laminates are disclosed in copending application Ser. No. 551,605, filed May 20, 1966 now U.S. Pat. No. 3,553,064. With the advent of products wherein the fiber layers are buried within and not exposed on the surface, it was found that improved strength characteristics of the product could be obtained by using tissue-fiber laminates wherein the fiber layers are substantially completely embedded in the adhesive pattern below the surface of the adhesive. The problem, however, is to obtain substantially complete fiber penetration and embedment in an economical and commercially feasible manner.

Accordingly, it is an object of the present invention to provide an economically attractive process for laminating a nonwoven fiber web to an adhesive printed tissue web which obtains substantially complete embedment of the fibers in the adhesive.

Other objects and advantages will become apparent upon reading the following detailed description and upon reference to the drawings, in which.

Briefly, the process described herein is useful for preparing tissue-fiber laminates comprised of a web of nonwoven fibers and a web of tissue. The process involves contacting a nonwoven fibrous web with a tissue web containing, on the contacting surface thereof, a pattern of plastisol adhesive, and securing the fibrous web to the tissue web by substantially completely embedding the fibers in the adhesive while the adhesive is in a fluid state. Thereafter, the adhesive is gelled and fused.

Figure 1:
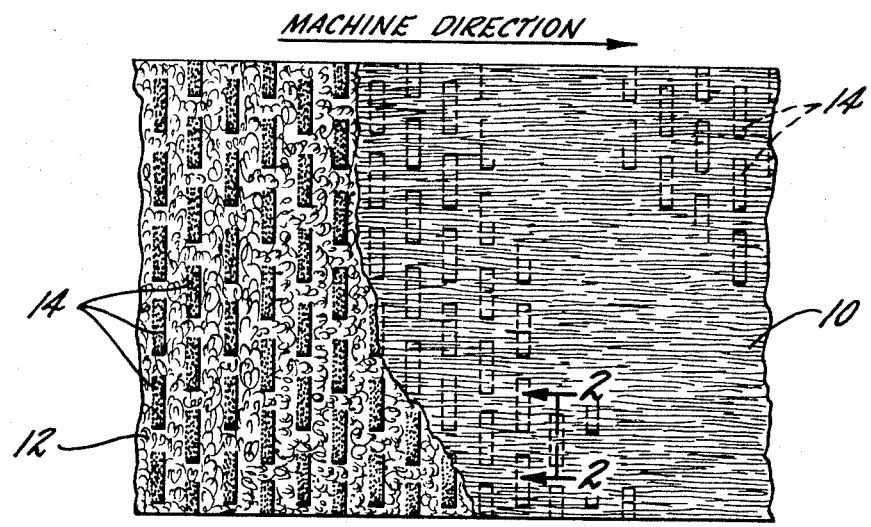
FIG. 1 is a fragmentary plan view of a tissue-fiber laminate prepared by the present process with sections of individual layers broken away.
Figure 2:
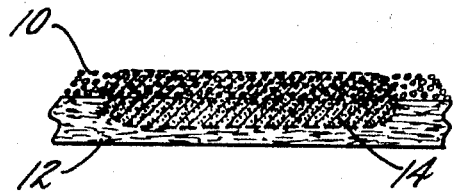
FIG. 2 is a cross-sectional view of the laminate of FIG. 1 taken along line 2—2.

Turning now to the drawings, FIG. 1 illustrates a preferred tissue-fiber laminate prepared according to the present process. The laminate contains a top layer of oriented, staple length fibers 10 adhesively bonded to a bottom layer of tissue 12 by means of an adhesive 14 deposited in a spaced pattern on the tissue layer. The adhesive is applied in an amount of about 4–8, and preferably about 5–7, grms./yd.² . The area occupied by the adhesive should be not more than about 25 percent, and preferably not more than about 15 percent, of the area of the tissue. As shown in FIG. 2, the adhesive should preferably penetrate into, but not through, the tissue layer and the fibers in the fiber layer are substantially completely embedded in the adhesive over the area of original contact between the fiber layer and the patterned adhesive.

Nonwoven fiber webs prepared either from continuous or staple length fibers and tissue webs useful in the present process are well known. Particularly suitable are those disclosed in the earlier mentioned U.S. Pat. Nos. 3,327,708 and 3,484,330 and application, Ser. No. 551,605. Therein, oriented fiber webs of drafted staple length fibers and tissue webs of cellulose wadding are shown. However, other nonwoven fibrous webs such as those prepared by carding, garnetting or air laying and continuous filament webs such as prepared in U.S. Pat. Nos. 3,341,374 and 3,338,992 can also be used. Similarly tissue webs other than cellulose wadding, such as those of cotton or rayon fibers, can also be employed.

The basis weight of the webs employed herein is not particularly important so long as heat transfer can be achieved through the laminate at a reasonable rate. In general, the tissue web will have a weight of about 10–25, and preferably about 10–15, grms./yd.². The fibrous web generally has a weight of about 2.5–10, and preferably about 3–6 grms./yd.²

Plastisol type adhesives (which term includes organosols with up to about 20 percent solvent) are preferred for use herein, and representative species of such are disclosed in the above-mentioned patent and applications. A principal requirement of the plastisols is that it be fusable at a temperature which is not detrimental to either the tissue or fiber component of the laminate and that it have a suitable application viscosity. Vinyl chloride plastisols which contain vinyl chloride polymers and copolymers and organic phthalate, sebacate, adipate, or phosphate plasticizers are particularly suitable. As described in TAPPI 50 (1), 79A–84A, at low temperatures, plastisols are fluids comprising vinyl resin particles uniformily distributed in a continuous phase of plasticizer. As the plastisol is heated, the plasticizer is absorbed into the resin particles, thus swelling them. Eventually, all the plasticizer is absorbed. The temperature at which such occurs is termed the gel point. On further heating, the swelled resin particles begin to lose their particulate identity and eventually a continuous plastic phase evolves. Such occurs at a temperature termed the fusion point and, in such condition, the plastisol is said to be fused. On cooling, the fused plastisol exhibits very desirable tensile strength characteristics and is quite flexible.

Figure 3:
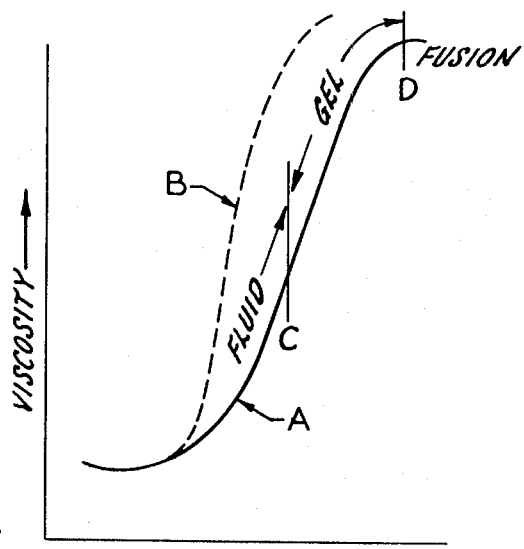
FIG. 3 is a graphical representation of the change in viscosity of a plastisol adhesive as a function of temperature.

FIG. 3 illustrates the viscosity temperature characteristics of a plastisol, A, with C and D indicating the gel and fusion points, respectively. Ordinarily gelling occurs at about 140°–220° F. and fusion at about 280°–350° F. The gel point for a particular plastisol can be determined by the hotbench test method described in "Plastics Technology" Oct., 1960, pp. 43–47. The dotted line in FIG. 3 illustrates the viscosity - temperature characteristics of another plastisol, B. As is evident, plastisol B fuses faster than plastisol A, i.e., fusion can be obtained with a smaller temperature increase. Plasticizer selection can be used to establish an appropriate fusion rate.

The essential feature of the process described herein is that the nonwoven fibrous web be embedded in the plastisol adhesive while the adhesive is still in the fluid state, i.e., the adhesive has not passed through its gel point. After embedment, the adhesive can be gelled and fused. In the fluid state, the adhesive offers little resistance to fiber penetration and, accordingly, substantially complete fiber embedment can be achieved without extraordinarily high pressures being applied. This, of course, makes preparation of the laminates less expensive and easier to accomplish. In addition, since the fibrous web is substantially completely embedded in the adhesive, the laminates are quite strong.

Figure 4:
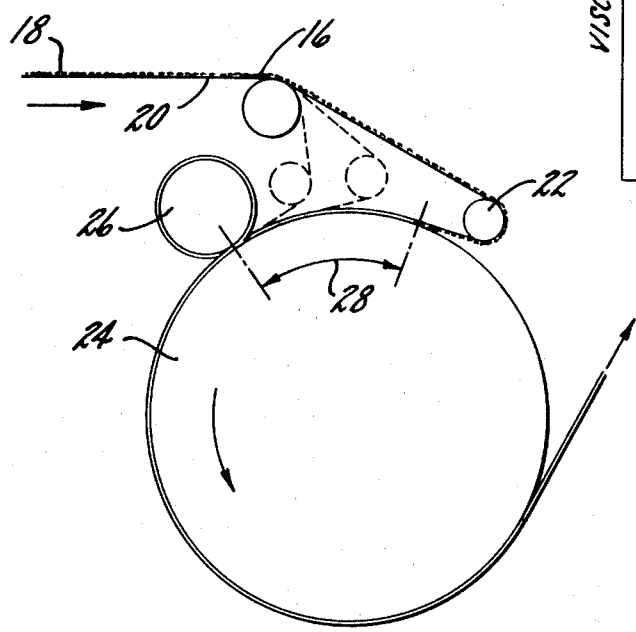
FIG. 4 is a schematic representation illustrating a manner in which the present process can be accomplished.

FIG. 4 illustrates a manner in which the present process can be accomplished. Therein, an unsecured sheet material 16 comprised of a top layer of nonwoven fibers 18 and a bottom layer of an adhesively printed tissue web 20 is conveyed around an adjustable pre-wrap roll 22, and onto the surface of a driven heated drum 24; the fiber layer being in contact with the drum surface. On contact with the drum, the adhesive is in the fluid state. Thereafter, the sheet is conveyed on the drum surface into the nip formed by the drum 24 and the illustrated squeeze roll 26. Nip pressures of about 15–70 pli are useful while pressures of 50–60 are preferred. Prior to entering the nip, the adhesive should still be in the fluid state. Passage through the nip serves to substantially completely embed the fibers in the adhesive, and, thereafter, the sheet is conveyed on the drum until the adhesive is substantially fused (Condition D in FIG. 3) at which point it has a viscosity of about $10^6$–$10^7$ centipoise.

While not an essential feature of the invention claimed herein, certain additional advantages to those discussed hereinbefore can be achieved by controlling the position of the pre-wrap roll 22 so that the adhesive, while still fluid, is at just about its gel point as the laminate enters the nip. Quite obviously, since contact with the drum tends to elevate the adhesive temperature, the state of the adhesive prior to entering the nip will be dependent on the amount of pre-wrap 28.

By controlling the pre-wrap so that the adhesive is at just about its gel point several desirable results can be achieved. First, since the adhesive viscosity increases as the gel point is approached, there is less likelihood that (1) the adhesive will "strike through" the tissue web on fiber embedment resulting in an adverse laminate appearance or adhesive build-up on roll 26, or (2) that the deposited pattern of adhesive will be distorted so as to adversely affect laminate hand or feel. Secondly, since adhesive gel tends to "lock in" the embedded fibers, rapid gelling minimizes the tendency for the fibers to become dislodged on subsequent sheet movement. Of course, the nearer the adhesive is to the gel point when embedment occurs, the more rapidly the subsequent transformation can be accomplished. This latter feature is particularly desirable when the nonwoven fibrous web is very tenuous such as a drafted fiber web. In order to enhance preservation of the characteristics of the web resulting from fiber orientation it is important that the fibers be securely held in the adhesive. Additional advantages associated with fiber embedment in an adhesive at just about the gel point as well as various techniques for accomplishing such are described in detail in copending Condon, Robinson, and Wills application, entitled "Process For Preparation Of Nonwoven Fibrous Web - Tissue Laminate," filed on even date herewith.

As previously indicated, substantially complete fiber embedment yields strong laminates. Laminate strength can be measured by using an Instron machine. For oriented fiber webs of staple length fibers the strength is reported as the laminate bonding efficiency, which is obtained by dividing the tensile strength of the laminate measured with a jaw separation of about 0.5 inches longer than the longest of the oriented fibers by the tensile strength of the laminate measured with substantially no jaw separation. A crosshead speed of about 2 inches per minute is used for the measurement with no separation, while a speed of 12 inches per minute is used for the measurement with separation. A bonding efficiency of 1 is ideal.

The bonding efficiency of the laminates prepared according to the aforementioned Sokolowski patent is rarely above 0.7. With the present process, laminates with bonding efficiencies of 0.7–0.95, and generally at least 0.85, can be obtained. On occasion, efficiencies of higher than 0.95 can also be achieved.

The following illustrates the preparation of a laminate according to the method described herein. Using as starting materials a tissue web having a weight of 13 grms./yd.$^2$ and a drafted fiber web having a weight of 4.5 grms./yd.$^2$, a tissue fiber laminate can be prepared with an apparatus arrangement similar to that shown in FIG. 4, having the following specifications: A plastisol adhesive of 100 parts polyvinyl chloride resin, 50 parts dioctyl phthalate, and 10 parts mineral spirits was used. It was applied in a brick pattern in an amount of 6.5 grms./yd.$^2$ with 20 percent coverage.

Heated Drum = 30 inch diameter, "Teflon" coated, steam heated, 365° F.
Squeeze Roll = 7 inch diameter, silicon rubber cover with a durometer 60A
Squeeze Roll = Drum 24 nip pressure = 50–60 pli.
Conveying Speed = 200–700 feet per minute
Sheet contact length with Drum 24 prior to nip = 12–30 inches (higher wrap associated with higher speed)

Thus, it is apparent that there has been provided a process for making tissue-fiber laminates which fully satisfies the aims, objectives, and advantages set forth above.

I claim as my invention:

1. In the process of preparing a tissue-fiber laminate comprising preparing an unsecured laminate by contacting a web of nonwoven fibers with a web of tissue and securing the fiber web to the tissue web by means of a plastisol adhesive partially embedded in the tissue web; the improvement wherein the fiber web is secured to the tissue web by substantially completely embedding the fibers thereof in the plastisol adhesive while the adhesive is still in a fluid state and, while said fibers are so embedded, gelling and fusing the adhesive.

2. The process of claim 1 wherein the web of nonwoven fibers is a web of drafted staple length fibers.

3. The process of claim 2 wherein the tissue web is a web of cellulose wadding.

4. The process of preparing a tissue-fiber laminate comprising preparing an unsecured laminate by contacting a web of nonwoven fibers with a web of tissue containing on the contacting surface thereof a pattern of a plastisol adhesive in the fluid state, bringing the unsecured laminate into contact with a rotating drum the surface of which is at a temperature above the fusion temperature of the adhesive, substantially completely embedding the fiber web in the adhesive while the adhesive is still in the fluid state and conveying the laminate on the surface of the drum to gel and fuse the adhesive.

5. The process of claim 4 wherein the web of nonwoven fibers is a web of drafted, staple length fibers.

6. The process of claim 5 wherein the tissue web is a web of cellulose wadding.

* * * * *

PO-1050
(5/69)

UNITED STATES PATENT OFFICE
CERTIFICATE OF CORRECTION

Patent No. 3,654,020          Dated  May 11, 1972

Inventor(s)          James E. Robinson

It is certified that error appears in the above-identified patent and that said Letters Patent are hereby corrected as shown below:

In the Specification:

Col. 2, l. 27 change "A" to --The--;

l. 28 change "requirement" to --requirements--;

l. 28 change "plastisols" to --plastisol--;

l. 28 change "is" to --are--;

l. 36 change "uniformily" to --uniformly--.

In the Claims:

Claim 1, l. 31 delete "of nonwoven fibers" and insert on line 30 after the words "contacting a" --nonwoven fiber--;

Claim 2, ll. 38 and 39 delete "of nonwoven fibers" and insert on line 38 after the words "wherein the"

PAGE TWO

PO-1050
(5/69)

UNITED STATES PATENT OFFICE
CERTIFICATE OF CORRECTION

Patent No. 3,654,020      Dated May 11, 1972

Inventor(s)    James E. Robinson

It is certified that error appears in the above-identified patent and that said Letters Patent are hereby corrected as shown below:

--nonwoven fiber--;

Claim 4, ll. 43 and 44 delete "of nonwoven fibers" and insert on line 43 after the words "contacting a" --nonwoven fiber--;

Claim 5, ll. 52 and 53 delete "of nonwoven fibers" and insert on line 52 after the words "wherein the" --nonwoven fiber--.

Signed and sealed this 7th day of November 1972.

(SEAL)
Attest:

EDWARD M. FLETCHER, JR.
Attesting Officer

ROBERT GOTTSCHALK
Commissioner of Patents